US008165846B2

(12) United States Patent
Cheriere et al.

(10) Patent No.: US 8,165,846 B2
(45) Date of Patent: Apr. 24, 2012

(54) METHOD AND DEVICE FOR FAULT AUTO-DETECTION IN AN ON-BOARD SYSTEM

(75) Inventors: Vincent Cheriere, Montastruc la Conseillere (FR); Joao Aramis Dos Santos Girio, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 494 days.

(21) Appl. No.: 12/476,436

(22) Filed: Jun. 2, 2009

(65) Prior Publication Data
US 2010/0042873 A1    Feb. 18, 2010

(30) Foreign Application Priority Data

Jun. 13, 2008    (FR) ...................................... 08 53953

(51) Int. Cl.
*G06F 11/30* (2006.01)
*G06F 11/00* (2006.01)
*G06G 7/62* (2006.01)
(52) U.S. Cl. .............................. 702/183; 714/25; 703/17
(58) Field of Classification Search .................. 702/183, 702/81, 84–85, 89, 94–95, 97, 127–129, 702/155, 158, 176–177, 179, 181–182, 184–185, 702/187–191, 193–194; 703/2, 4, 13, 17, 703/19; 706/12; 708/3, 8, 200, 270, 300–301, 708/422, 426, 441; 714/1, 25–26, 30, 37, 714/46, 47.1–47.3, 48, 100, E11.024, E11.029
See application file for complete search history.

(56) References Cited

FOREIGN PATENT DOCUMENTS

| EP | 1 154 237 A1 | 11/2001 |
| EP | 1 643 332 A2 | 4/2006 |

OTHER PUBLICATIONS

Manders et al., Signal Interpretation for Monitoring and Diagnosis, A Cooling System Testbed, Jun. 2000, IEEE Transactions on Instrumentation and Measurement, vol. 49, No. 3, pp. 503-508.*
C. J. Burges, "A Tutorial on Support Vector Machines for Pattern Recognition, Data Mining and Knowledge Discovery" Data Mining and Knowledge Discovery, 2, 121-167 (1998).
A. Cornuejols, << Une nouvelle méthode d'apprentissage: Les SVM. Séparateurs à vaste marge >> ["A New Learning Method: The SVMs. Support Vector Machines"] Bulletin De L'Afia, 14 No. 51—Jun. 2002.
G. Loosli, "Simple and Rapid SVM Tool Box", 1st Soumission a RIA, le Dec. 9, 2004. http://gaelle.loosli.fr/fr.
S. Canu, << Les Machines à noyaux et leur mise en oeuvre >> ["The Kernel Machines and Their Use"] (2007), GdR ISIS—ENST Paris.
N. Cristianini, "Support Vector and Kernel Machines" (2001), http://www.support-vector.net//.

* cited by examiner

*Primary Examiner* — Michael Nghiem
*Assistant Examiner* — Toan M Le
(74) *Attorney, Agent, or Firm* — Oblon, Spivak, McClelland, Maier & Neustadt, L.L.P.

(57) ABSTRACT

A method for automatic fault detection with data representing a fault in an on-board system, the method including: determining, with a processor, at least two physical variables represented by said data, said at least two physical variables including at least one time-dependent variable representative of a persistence of an event in time, and at least one instantaneous variable; representing, with the processor, said data by points of a space whose coordinates are values of said at least two physical variables; an detecting, with the processor, a fault by employing a frontier defining a subspace of said space in which representation of a datum is associated with the detection of a fault.

22 Claims, 6 Drawing Sheets

Fig. 7

METHOD AND DEVICE FOR FAULT AUTO-DETECTION IN AN ON-BOARD SYSTEM

TECHNOLOGICAL FIELD

The present invention relates to a method and a device for automatic fault detection in an on-board system. It applies more particularly to solving:
the problem of the compromise in time between detection and confirmation before the presence of a fault is declared, and
the estimate of the delay in detection, or in other words the time lag between the real fault event and its detection by the system.

BACKGROUND OF THE INVENTION

In the majority of current avionic systems, the detection and confirmation of a fault are accomplished by following a sequential treatment. A first analysis is performed with an instantaneous detection technique and then a confirmation delay is used before confirmation of the existence of the fault and the treatment thereof by a maintenance system.

Figure 1:
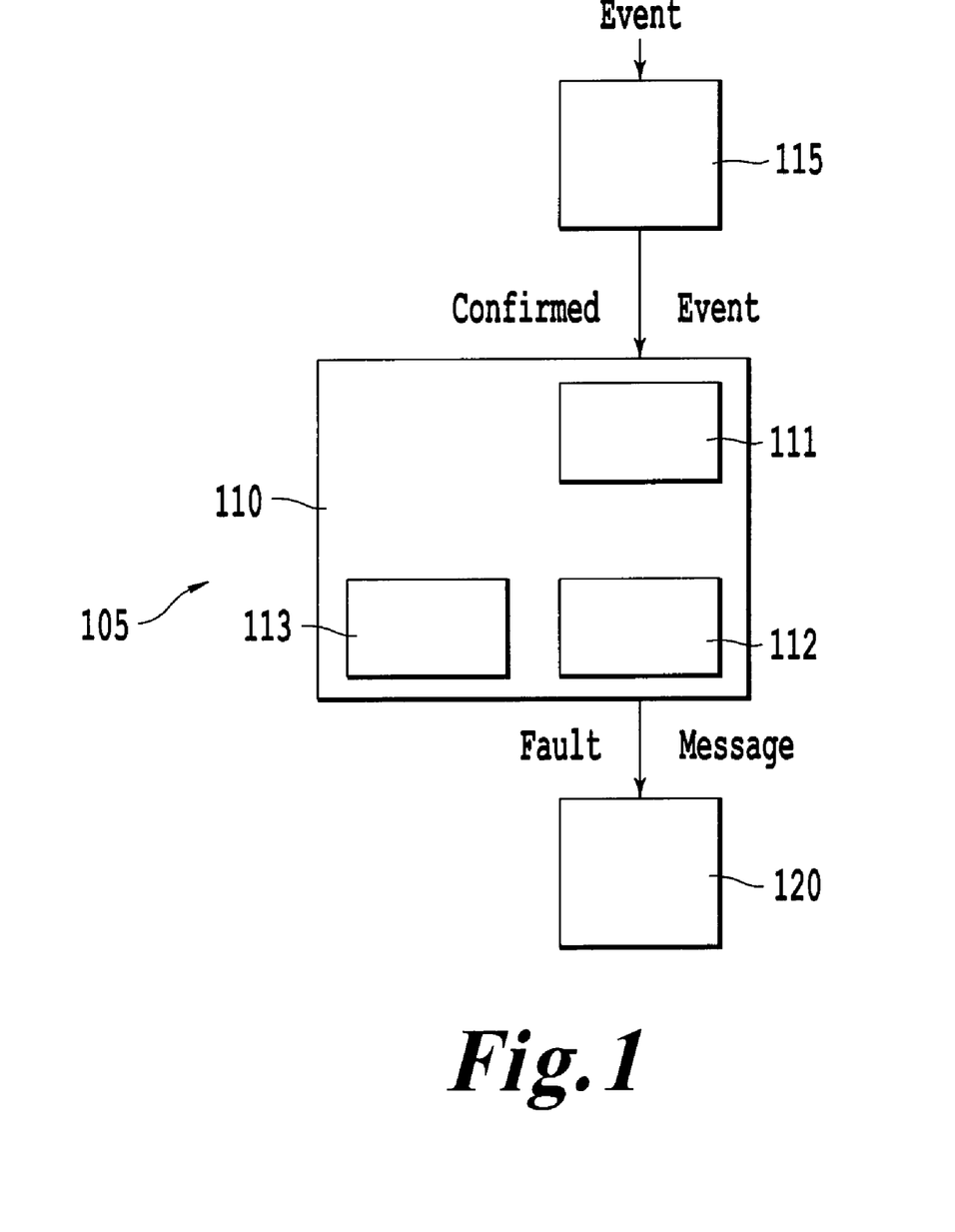
FIG. 1 represents a fault-detection device of known type.

As illustrated in FIG. 1, the current avionic fault detection systems 105 are based on the ARINC 624 standard (ARINC being the acronym for Aeronautical Radio, Incorporated, a registered trademark), in which a software agent 110 within the systems (known in English as "Built-In Test Equipment", or BITE) has the task of collecting raw detection information items arriving from the operational part 115 for surveillance of the system. Agent 110 consolidates these information items in time and analyzes them in order to diagnose whether an equipment item is faulty in the system. In the case of detection of a fault, agent 110 sends a diagnostic message to a centralized maintenance system 120, or CMS (acronym for "Centralized Maintenance System"). The CMS correlates the messages from the different systems of the airplane. The function of consolidation block 111 of agent 110 most often consists in adding an additional confirmation delay in order to increase the confidence in the persistence of the fault before transmitting a fault diagnosis to CMS 120. Report ("reporting") block 112 effects emission of the fault diagnosis message. Memory block 113 stores the raw data with which a fault has been detected as well as the contents of the fault diagnosis messages.

Figure 2:
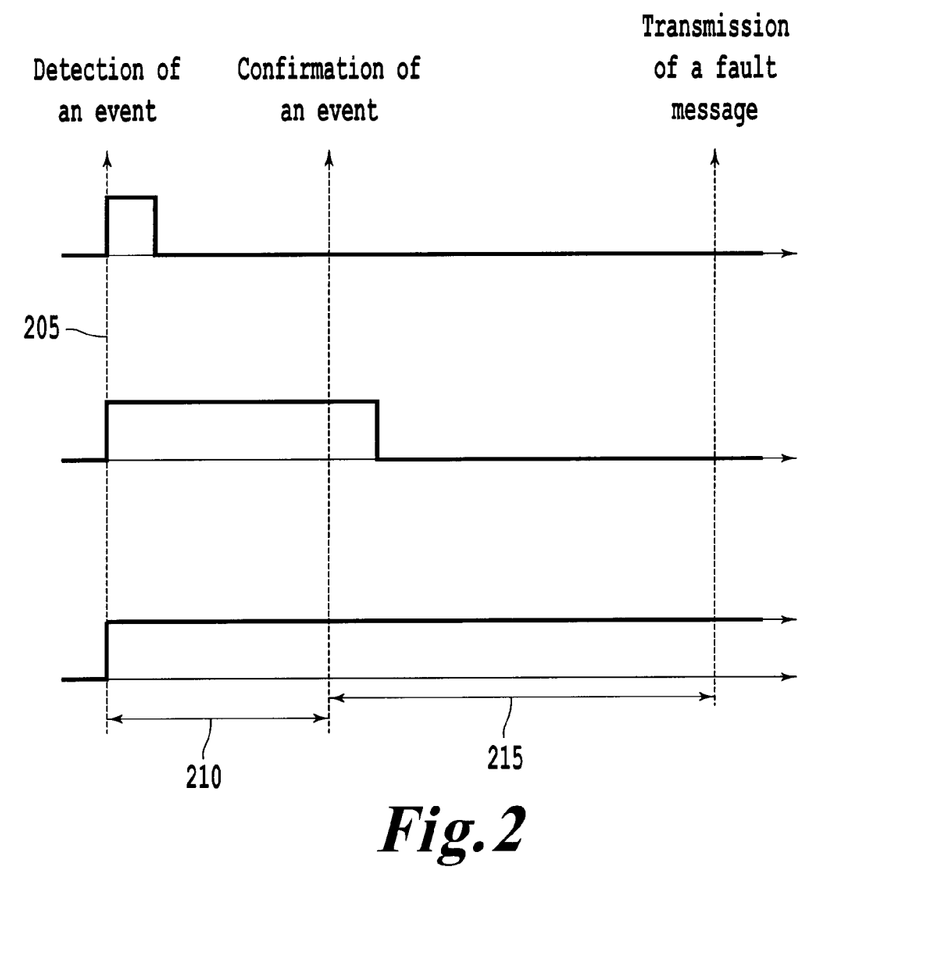
FIG. 2 illustrates, by a timing diagram, a consolidation principle employed in the device illustrated in FIG. 1.

FIG. 2 illustrates, in a timing diagram, the principle of consolidation effected by block 111. At an instant 205, an event capable of representing a fault is received by operational part 115. If the signal representative of this event does not continue for a delay 210, operational part 115 does not transmit a message to agent 110, as illustrated in the first line of FIG. 2. If, on the contrary, the signal representative of the event continues for a delay 210, operational part 115 transmits a message to agent 110, as illustrated in the second and third lines of FIG. 2. If the signal continuing during delay 210 does not continue during consolidation delay 215, agent 110 does not transmit a fault diagnosis message to CMS 120, as illustrated in the second line of FIG. 2. If the signal that has been continued during delay 210 also continues during consolidation delay 215, agent 110 transmits a fault diagnosis message to CMS 120, as illustrated in the third line of FIG. 2.

It is important that the detection results are consolidated in time by the agent, in order to avoid mistaking transient events for events representing a fault.

In addition, it is important that detections of faults are stamped with a time as close as possible to the real fault instant, in order that the algorithms of the CMS 120 will correctly correlate the messages.

In certain systems, by virtue of empirical sets of rules, the confirmation times must be readjusted. The new value for the confirmation time is sometimes obtained from ground tests (on a bench) or even flight tests. These readjustments take place too late in the development and sometimes even after the airplane has been placed in service, thus increasing the development costs and the maintenance costs due to unjustified replacements of equipment items and to the time lost on the ground for fault-finding.

SUMMARY

One of the problems underlying the present invention consists in finding a solution for consolidation in time which can be justified mathematically and not only by experience, for estimating the detection delay in order to time-stamp the fault event very precisely.

To this end the present invention applies, according to a first aspect, to a method for automatic fault detection on the basis of data capable of representing a fault in an on-board system, characterized in that it includes:
a step of determining at least two physical variables represented by the said data, the said physical variables including at least:
one time-dependent variable representative of the persistence of an event in time and
at least one instantaneous variable;
a step of representing the said data by points of a space whose coordinates are the values of the said physical variables and
a step of detecting a fault by employing a frontier defining a subspace of the said space in which the representation of a datum is associated with the detection of a fault.

By virtue of these arrangements there are available precise criteria for detecting the occurrence of a fault as opposed to a transient phenomenon. Thus one of the contributions of the invention lies in the fact of employing a parametric consolidation function represented by the frontier of the subspace, which function is physically justified and mathematically optimized, whereas the prior art methods are empirical. The performances obtained on studied practical cases are clearly superior to those obtained with the usual techniques: by employing the present invention, a rate of false detection of 3% is obtained, compared with the rate of 20% obtained with the traditional sequential technique.

According to particular characteristics, the method constituting the object of the present invention as explained concisely hereinabove additionally includes a step of estimating the reactivity of detection of the said fault as a function of the said frontier and of the position of the representation of the first datum associated with a fault in the said subspace.

By virtue of these arrangements, precise criteria are available for estimating the delay elapsed between the occurrence and detection of the fault.

Another contribution of the invention is found in the evaluation of the reactivity of detection in time, thus making it possible to correct poor time-stamping. With this reactivity information, it is possible in scientifically justified manner to regulate for the waiting time for corroboration of a fault. The centralized maintenance system (CMS) that establishes the correlation between the received fault messages in order to isolate the faults of the airplane can time-stamp the faults precisely. In this way the efficacy of the maintenance system is improved with a reduction of unjustified maintenance messages caused by orphans (which have not been correlated with other messages).

According to particular characteristics, in the course of the step of estimating the reactivity, the estimated reactivity is a function of the distance between the first point in the said subspace and the orthogonal projection of the said first point on the hyperplane formed by the frontier.

The use of this distance makes estimating the reactivity more independent of the chosen representation. It is seen that, in the case of two dimensions, this hyperplane is a curve.

According to particular characteristics, the method constituting the object of the present invention additionally includes a step of determining the said frontier as a function of values of the said physical variables representative of learning data distributed in different classes as a function of whether or not they are associated with a fault.

According to particular characteristics, in the course of the step of determining the said frontier, the learning data are obtained from a simulation of a model of dysfunctioning, each point in the said space being associated with an information item of whether or not maintenance is necessary.

According to particular characteristics, in the course of the step of determining the said frontier, the learning data, the data are obtained from bench or flight tests.

According to particular characteristics, in the course of the step of determining the said frontier, the frontier separates two classes of events:
the events necessitating maintenance and
the events not necessitating maintenance.

According to particular characteristics, in the course of the step of determining the said frontier, the optimal frontier is determined on the basis of least squares between the points of the different classes.

According to particular characteristics, in the course of the step of determining the said frontier, support vector machines are employed.

According to a second aspect, the present invention applies to a device for automatic fault detection on the basis of data capable of representing a fault in an on-board system, characterized in that it is provided with:
a means for determining at least two physical variables represented by the said data, the said physical variables including at least:
one time-dependent variable representative of the persistence of an event in time and
at least one instantaneous variable;
a means for representing the said data by points of a space whose coordinates are the values of the said physical variables and
a means for detecting a fault by employing a frontier defining a subspace of the said space in which the representation of a datum is associated with the detection of a fault.

According to particular characteristics, the device constituting the object of the present invention as explained concisely hereinabove is additionally provided with a means for estimating the reactivity of detection of the said fault as a function of the said frontier and of the position of the representation of the first datum associated with a fault in the said subspace.

Since the particular advantages, objectives and characteristics of this device are similar to those of the method as explained concisely hereinabove, they are not repeated here.

BRIEF DESCRIPTION OF THE DRAWINGS

Other particular advantages, objectives and characteristics of the present invention will become evident from the description hereinafter, provided by way of explanation and in no way limitative, with reference to the attached drawings, wherein.

DETAILED DESCRIPTION

Figure 3:
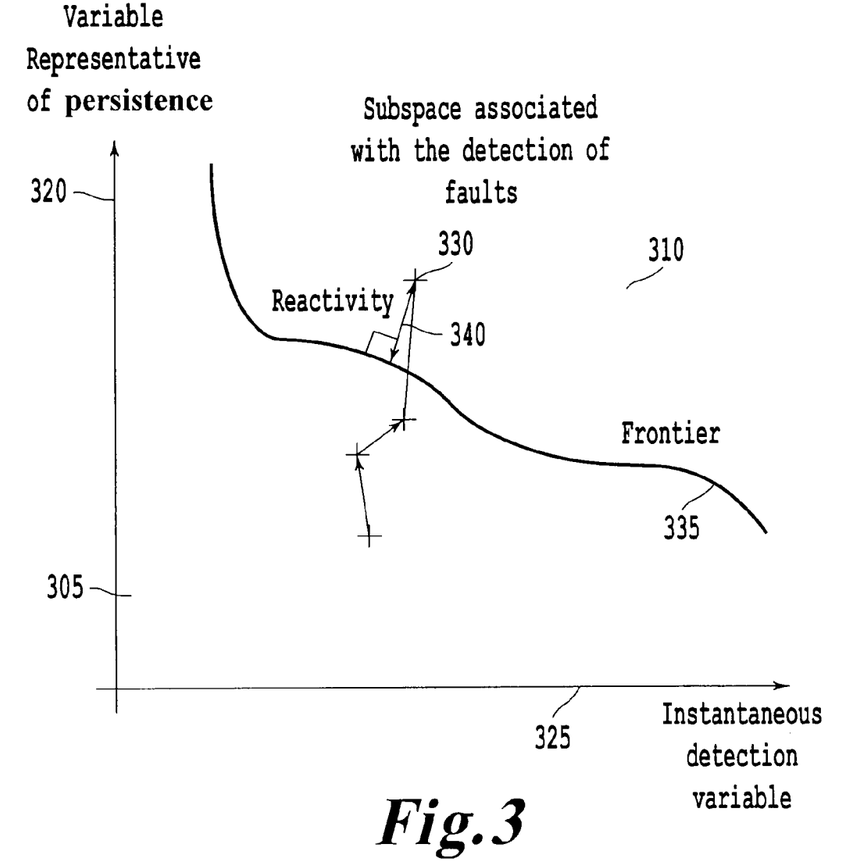
FIG. 3 represents, in a plane, points representative of physical variables or parameters and a frontier employed in a particular embodiment of the method constituting the object of the present invention, FIG. 4 schematically represents a response signal of a pitch angle transducer, which signal is capable of representing the occurrence of a fault.

FIG. 3 shows a space 305 (in this case a plane) organized according to a frame of reference whose axes respectively represent:
a time-dependent variable 320 representative of the persistence of an event in time, and
at least one instantaneous variable 325.

The event data are therefore represented by values of these physical variables and then by points 330 of a space whose coordinates are these values of the physical variables.

A frontier 335 separates a subspace 310 from space 305, subspace 310 being that in which the representation of a datum is associated with the detection of a fault.

An estimate of the reactivity of detection of a fault is a function of the said frontier and of the position of the representation of the first datum associated with a fault in the said subspace, for example proportional to the distance 340 between the point representing this first datum and the frontier.

Figure 4:
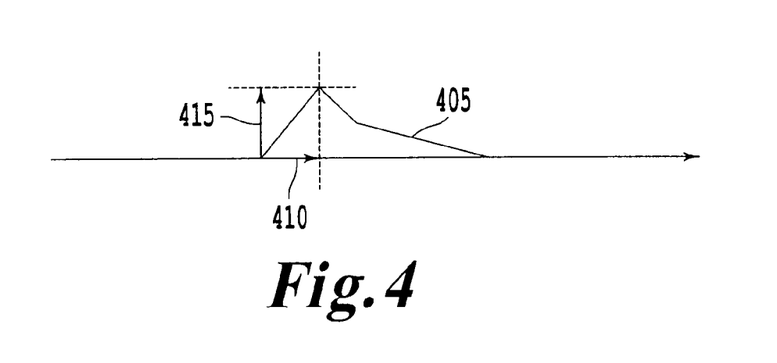

In a first embodiment of the invention, there is employed a simplified model of a DC-8 automatic pilot, which exercises control over the pitch angle. There is chosen a variable for generating learning points to permit establishment of a physical interpretation. In the present case, the abscissa represents the maximal amplitude of the response of the transducer after a disruption, and the ordinate represents the time necessary to arrive at this maximal amplitude in order to quantify the persistence of the disruption. FIG. 4 represents, for a signal 405 having a disruption, the abscissa 410 and the ordinate 415 associated with this disruption.

As regards the association of a point possessing these coordinates with an information item representing whether or not maintenance is necessary, it is considered that the control rule is failing and therefore necessitates maintenance when the difference between the setpoint and the pitch angle obtained with the control rule exceeds 5%.

By intentionally introducing a bias in the transducer and observing the effect of this bias, there are generated two classes of points:
the class of points corresponding to the biases that lead to failures of the control rule, and
the class of points corresponding to the biases not disrupting the rule (weak transient disruption of short duration).

By applying support vector machines ("SVM"), there is determined a frontier, known as "decision frontier" 335, between these classes, as illustrated in FIG. 3. The performance of this frontier 335, or in other words its capacity to separate the two classes distinctly, characterized by the rate of success of good separation of points, is determined. For example, a rate of 97% indicates that 3% of the points were classified in the class that does not correspond to them.

Once this technique was developed on a case modeled on a computer, it was tested on a real case, in order to see whether it was still valid with the constraints of real-time systems (sampling, noise, etc.). For this purpose a specific application was set up. Records of flight test data of an airplane were retrieved and a study concerning locking ("skid") of the wheels during braking was carried out. Among the available signals, that which measures the speed of the wheels was chosen.

Figure 5:
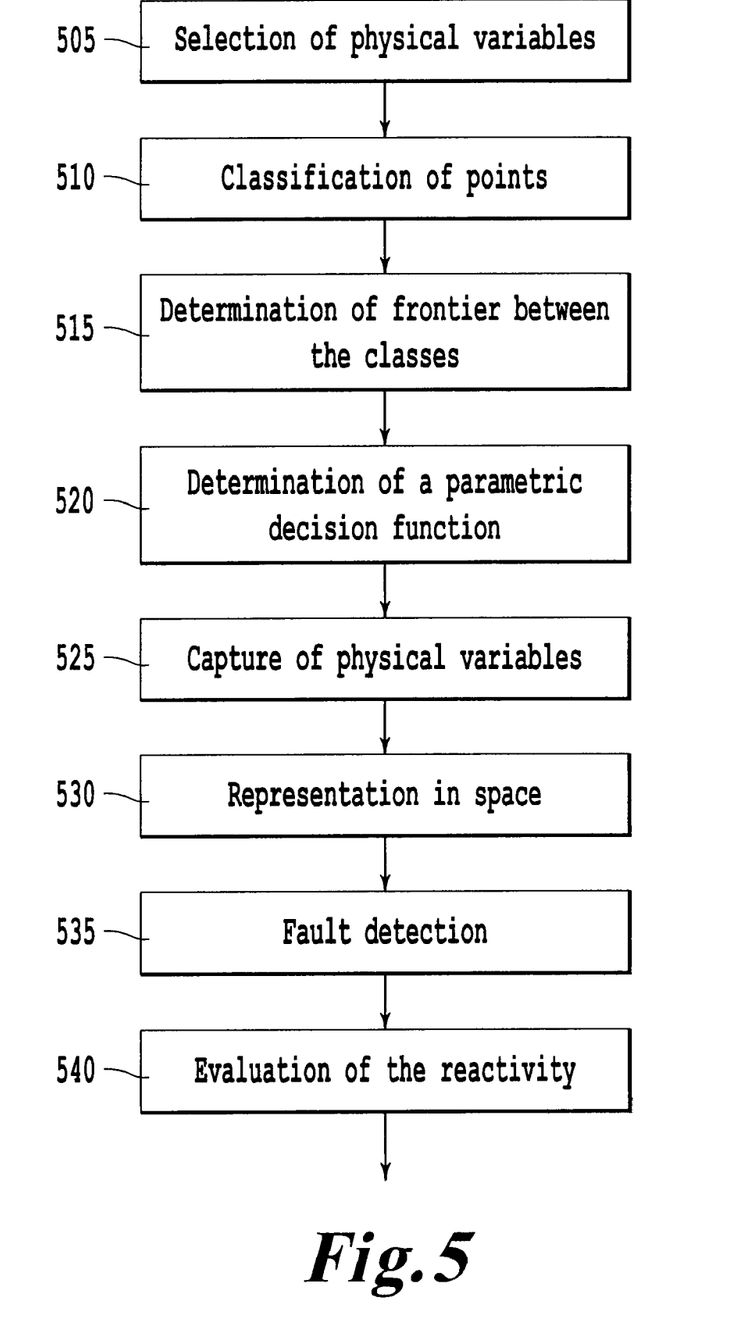
FIG. 5 represents, in the form of a logic diagram, the steps employed in a particular embodiment of the method constituting the object of the present invention, FIG. 6 schematically represents a response signal of a speed transducer, which signal is capable of representing the occurrence of a fault, and FIG. 7 schematically represents a particular embodiment of the device constituting the object of the present invention.
Figure 6:
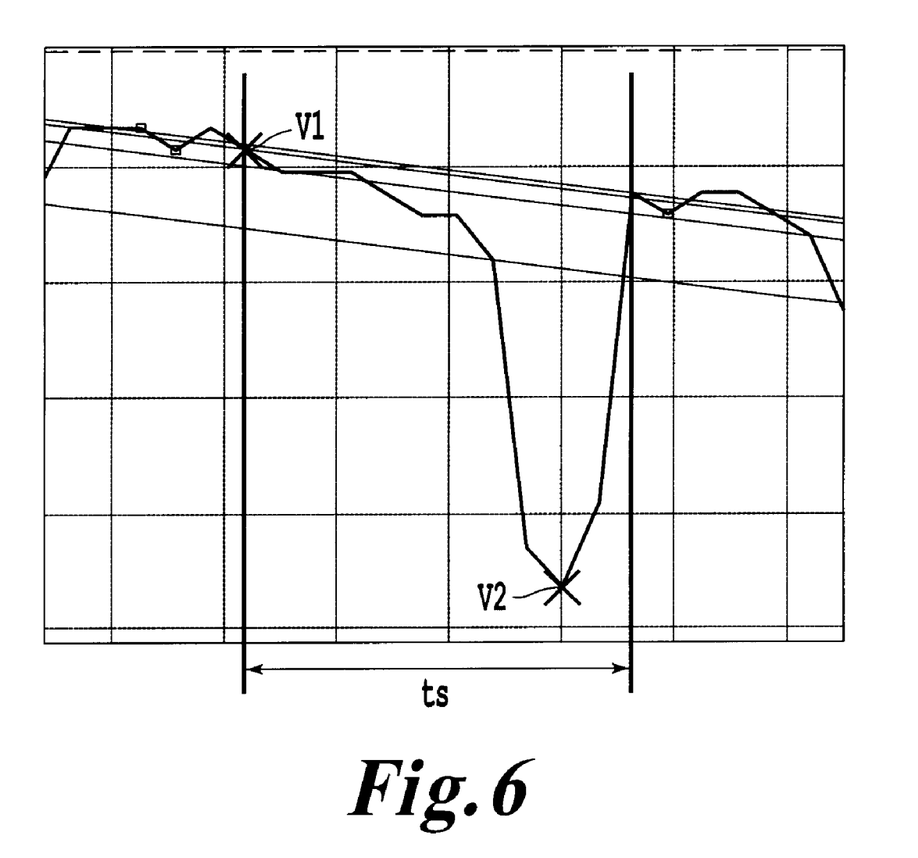

As illustrated in FIG. 5, there are chosen, in the course of a step 505, physical variables or parameters, in order to obtain, in the Cartesian plane, a scatter of fairly "separable" points to be treated by the SVMs:

on the abscissa, the parameter of interest chosen for surveillance is the relative loss of kinetic energy divided by the speed reduction time:

$$\varepsilon = \frac{\left(\frac{V_1^2 - V_2^2}{V_1^2}\right)}{t_b}$$

where $V_1$ is the speed before acknowledgment of a margin considered to be normal and $V_2$ is the lowest speed after a reduction, as illustrated in FIG. 6, and on the ordinate, the parameter representing the persistence is the total duration of a critical event: $T=t_s$: persistence of a critical event.

The resultant parametric function is denoted $f(\varepsilon, T)$.

Once the parameters have been defined, in the course of a step 510, the points possessing the coordinates indicated hereinabove are classified. In the case of detection of locking of the wheels during braking, the classes are, for example, "Transient disruptions due to a momentarily disrupted speed information item" and "Disruptions associated with a real skidding problem".

The dynamics of braking of wheels when the airplane is landing correspond to a parabola, which begins at high speed, at the moment at which the wheels touch the ground, and ends at zero, when the airplane is stopped. On this basis the speed trajectory known as "reference speed" can be calculated through a linear regression, which makes it possible to construct a reference curve.

A first margin is situated at 0.01% of the reference speed, making it possible to start the search for a learning point. In FIG. 6, the first oblique straight line represents the reference speed, and the second oblique line, parallel to the first, represents this first margin. Allowing for the standard deviation σ of the uncertainties in the speed information item, there is constructed a second margin situated at one times the standard deviation from the reference speed. There is also constructed a third margin situated at four times the standard deviation from the reference speed. In FIG. 6, the third oblique line, parallel to the first two, and the fourth oblique line, parallel to the first three, respectively represent the second and third margins. Assuming Gaussian uncertainty with respect to the speed, the speeds lower than the third margin have very low probability of being due to noise. As soon as the acquired wheel speed deviates from the first margin, the method of searching for the point begins.

Thereafter, in the course of step 510:

if the speed reduction profile does not descend below the second margin and rises toward the reference speed, then the point is considered to be due to a transient disruption, and if the speed reduction profile persists and descends below the third margin before rising toward the reference speed, then the point is considered to be due to skidding.

Once the points are disposed on the plane, in the course of a step 515 there is determined the separation frontier, preferably by employing the SVMs. The use of the SVM technique always necessitates a group of learning points. In other words, the determination of the decision frontier is based on this group of learning points.

Starting from a database obtained from flight tests, several simulations representing the different possible cases of skidding were run to achieve this learning.

After the learning phase, step 520 is the determination of the parametric decision function (limitrophic frontier between the two classes). For that purpose there is chosen a kernel function with which the points can best be separated. By performing tests, it is possible to analyze the performance of the SVMs and thus to choose that which is best adapted (optimal decision function).

As regards the theory of SVMs, the reader may consult the following reference publications:

C. J. BURGES, "A Tutorial on Support Vector Machines for Pattern Recognition, Data Mining and Knowledge Discovery" (1998), A. CORNUEJOLS, <<Une nouvelle méthode d'apprentissage: Les SVM. Séparateurs à vaste marge>> ["A New Learning Method: The SVMs. Support Vector Machines"] (2002), S. CANU, <<Les Machines à noyaux et leur mise en oeuvre>> ["The Kernel Machines and Their Use"] (2007), GdR ISIS-ENST Paris, G. LOOSLI, "Simple and Rapid SVM Tool Box", and N. CRISTIANINI, "Support Vector and Kernel Machines" (2001).

On the basis of data representative of physical variables captured during a test, for example obtained from bench tests or flight tests, step 525, these data are represented, in the course of a step 530, in space 305, in the form of points whose coordinates are determined according to the physical variables chosen in the course of step 505.

In the course of a step 535, a fault is detected on the basis of data captured by on-board transducers, represented by the values of selected physical variables, these values furnishing the coordinates of a point. When the first point is located in the subspace defined by frontier 335 and associated, by learning, with a fault or a maintenance operation, a fault is detected.

In the course of a step 540, an evaluation is made of the reactivity of detection of the fault by employing the frontier. The evaluation of the reactivity is based on the interpretation of the trajectory of the points in the Cartesian plane. After each speed reduction, the corresponding point (ε, T) is placed in the plane. The point is then compared with the decision frontier to determine the class to which it belongs (depending on whether it is a transient event or an event due to skidding).

At the instant at which the last point plotted has passed the frontier and is located in the zone of skidding events, the reactivity is estimated by calculating the distance between the point and the decision frontier. This distance is that which separates the first point in the said subspace and the orthogonal projection of this first point onto the hyperplane formed by frontier 335.

Once the reactivity is determined, there is determined, for the occurrence of skidding, a precise time stamp, which corresponds to the "fault event", in this example by subtracting the duration of reactivity from the time associated with this first point.

Figure 7:
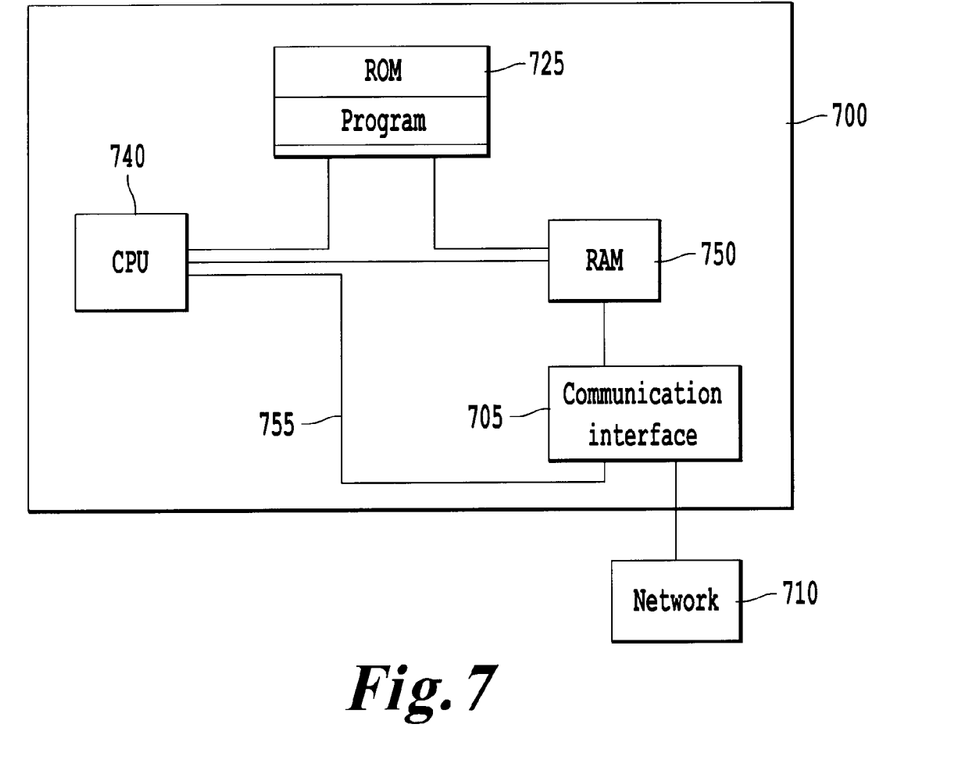

In FIG. 7, it is seen that, in a particular embodiment, the device constituting the object of the present invention has the form of a microcontroller device 700 equipped with software for implementing the method constituting the object of the present invention and with different peripherals.

Device 700 is connected to different peripherals, such as a communication interface 705 connected to a network 710 capable of transmitting digital data representative of data captured by on-board transducers in the system in which the objective is to detect faults.

The program that enables the device to employ the present invention is stored in non-volatile memory 725 (known as "ROM", the acronym for "Read Only Memory", in FIG. 7). More generally, an information-storage means, which can be read by a microcontroller or microprocessor, which may or may not be integrated with the device and which may be removable, retains the instructions of a program that implements the method constituting the object of the present invention.

A central unit 740 (known as "CPU", the acronym for "Central Processing Unit", in FIG. 7) executes the instructions of the program that implements the method constituting the object of the present invention. During boot-up, the program making it possible to implement the method constituting the object of the present invention stored in non-volatile memory, such as read-only memory 725, is transferred into a random-access memory 750, which then contains the instructions of this software program as well as registers for storing in memory the variables necessary for employment of the invention.

A communication bus 755 permits communication between the different elements belonging or connected to device 700. The representation of bus 755 is not limitative. In particular, central unit 720 is capable of communicating instructions to any element of device 700 directly or by way of another element of device 700.

For detection of a fault on the basis of data originating from transducers and capable of representing a fault in the on-board system, central unit 740 associated with memories 725 and 750 is composed of:
  a means for determining at least two physical variables represented by the said data, the said physical variables including at least:
    one time-dependent variable representative of the persistence of an event in time and
    at least one instantaneous variable;
  a means for representing the said data by points of a space whose coordinates are the values of the said physical variables and
  a means for detecting a fault by employing a frontier defining a subspace of the said space in which the representation of a datum is associated with the detection of a fault.

In some embodiments, central unit 740 associated with memories 725 and 750 is additionally composed of a means for estimating the reactivity of detection of the said fault as a function of the said frontier and of the position of the representation of the first datum associated with a fault in the said subspace.

The invention claimed is:

1. A method for automatic fault detection with data representing a fault in an on-board system, the method comprising:
    determining, with a processor, at least two physical variables represented by said data, said at least two physical variables including at least
      one time-dependent variable representative of a persistence of an event in time, and
      at least one instantaneous variable;
    representing, with the processor, said data by points of a space whose coordinates are values of said at least two physical variables; and
      detecting, with the processor, a fault by employing a frontier defining a subspace of said space in which representation of a datum is associated with the detection of a fault.

2. The method according to claim 1, further comprising:
    estimating, with the processor, the reactivity of detection of said fault as a function of said frontier and of a position of a representation of a first datum associated with said fault in the said subspace.

3. The method according to claim 2, wherein the estimating the reactivity includes using a function of a distance between the first datum in the said subspace and an orthogonal projection of said first datum on a hyperplane formed by the frontier.

4. The method according to claim 3, further comprising:
    determining, with the processor, said frontier as a function of values of said at least two physical variables representative of learning data distributed in different classes as a function of whether or not they are associated with the fault.

5. The method according to claim 4, wherein the determining said frontier includes obtaining the learning data from a simulation of a model of dysfunctioning, each point in the space being associated with an information item of whether or not maintenance is necessary.

6. The method according to claim 4, wherein the determining said frontier includes obtaining the learning data from bench or flight tests.

7. The method according to claim 4, wherein the determining said frontier includes determining the frontier on a basis of least squares between points of the different classes.

8. The method according to claim 4, wherein in the determining said frontier, support vector machines are employed.

9. The method according to claim 2, further comprising:
    determining, with the processor, said frontier as a function of values of said at least two physical variables representative of learning data distributed in different classes as a function of whether or not they are associated with a fault.

10. The method according to claim 9, wherein the determining said frontier includes obtaining the learning data from a simulation of a model of dysfunctioning, each point in the space being associated with an information item of whether or not maintenance is necessary.

11. The method according to claim 9, wherein the determining said frontier includes obtaining the learning data from bench or flight tests.

12. The method according to claim 9, wherein the determining said frontier includes determining the frontier on a basis of least squares between points of the different classes.

13. The method according to claim 1, further comprising:
    determining, with the processor, said frontier as a function of values of said at least two physical variables representative of learning data distributed in different classes as a function of whether or not they are associated with a fault.

14. The method according to claim 13, wherein the determining said frontier includes obtaining the learning data from a simulation of a model of dysfunctioning, each point in the space being associated with an information item of whether or not maintenance is necessary.

15. The method according to claim 13, wherein the determining said frontier includes obtaining the learning data from bench or flight tests.

16. The method according to claim 13, in which in the determining said frontier, the frontier separates two classes of events of
events necessitating maintenance, and
events not necessitating maintenance.

17. The method according to claim 13, wherein the determining said frontier includes determining the frontier on a basis of least squares between points of the different classes.

18. A device for automatic fault detection with data representing a fault in an on-board system, the device comprising:
a means for determining at least two physical variables represented by said data, said at least two physical variables including at least
one time-dependent variable representative of a persistence of an event in time, and
at least one instantaneous variable;
a means for representing said data by points of a space whose coordinates are values of said at least two physical variables; and
a means for detecting a fault by employing a frontier defining a subspace of said space in which representation of a datum is associated with the detection of a fault.

19. The device according to claim 18, further comprising:
means for estimating a reactivity of detection of said fault as a function of said frontier and of a position of a representation of a first datum associated with the fault in the said subspace.

20. The device according to claim 19, in which the means for estimating the reactivity uses a function of a distance between the first datum in said subspace and an orthogonal projection of said first datum on a hyperplane formed by the frontier.

21. A non-transitory computer readable storage medium encoded with instructions, which when executed by a computer causes the computer to execute a method for automatic fault detection with data representing a fault in an on-board system, the method comprising:
determining, with the computer, at least two physical variables represented by said data, said at least two physical variables including at least
one time-dependent variable representative of a persistence of an event in time, and
at least one instantaneous variable;
representing, with the computer, said data by points of a space whose coordinates are values of said at least two physical variables; and
detecting, with the computer, a fault by employing a frontier defining a subspace of said space in which representation of a datum is associated with the detection of a fault.

22. The non-transitory computer readable storage medium of claim 21, wherein the method further comprises:
estimating, with the computer, a reactivity of detection of said fault as a function of said frontier and of a position of a representation of a first datum associated with the fault in said subspace, wherein the estimating the reactivity uses a function of a distance between the first datum in said subspace and an orthogonal projection of said first datum on a hyperplane formed by the frontier.

* * * * *